United States Patent
Kreiss

[15] 3,664,357
[45] May 23, 1972

[54] METHOD AND INSTALLATION FOR DETECTING FLUID LEAKAGE FROM A PIPELINE

[72] Inventor: Manfred Kreiss, Mannheim-Kirchwald, Germany

[73] Assignee: Erdol-Raffinnerie Mannheim GmbH, Mannheim, Germany

[22] Filed: Dec. 23, 1970

[21] Appl. No.: 100,967

[52] U.S. Cl. ................................. 137/2, 137/486, 137/487.5
[51] Int. Cl. .......................................................... G05d 7/03
[58] Field of Search ................................... 137/2, 486, 487.5

[56] References Cited

UNITED STATES PATENTS 3,089,030   5/1963   Scherbatskoy ........................ 137/2 X
3,416,560   12/1968  Bruno ............................ 137/487.5 X

*Primary Examiner*—Henry T. Klinksiek
*Attorney*—Waters, Roditi, Schwartz & Nissen

[57] ABSTRACT

A pipeline leakage detection method and installation including measuring fluid flow rates in the pipeline at spaced points and obtaining summated and differentiated electrical current values corresponding to differences in the measured rates. Increases in current rates corresponding to a pipeline break are instantaneously relayed to means for sounding an alarm and to means for preventing further leakage flow of liquid product in the pipeline.

10 Claims, 1 Drawing Figure

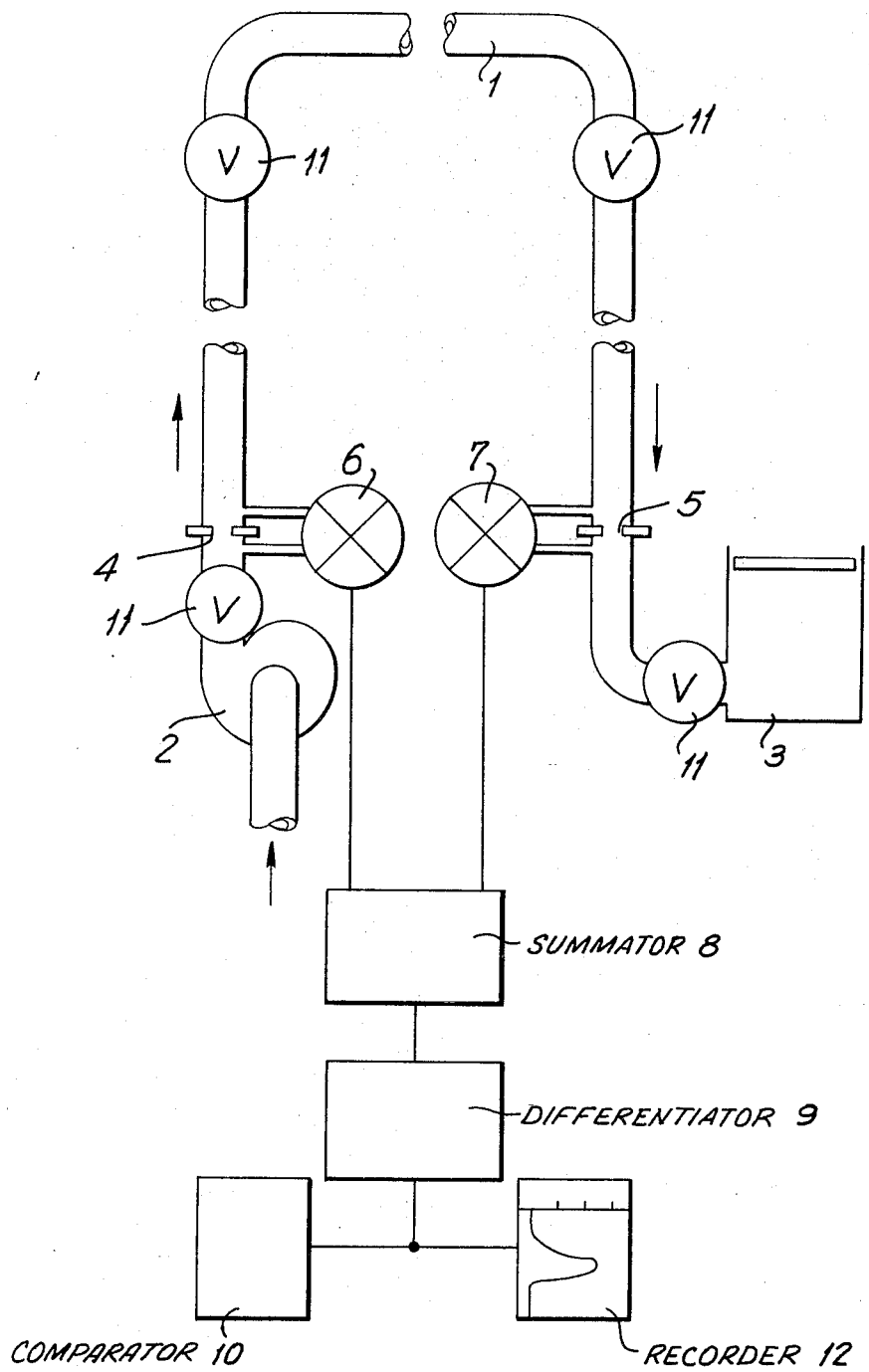

METHOD AND INSTALLATION FOR DETECTING FLUID LEAKAGE FROM A PIPELINE

BACKGROUND OF INVENTION

1. Field of the Invention

This invention relates to a method and installation for detecting fluid leakage and, more particularly, for rapid or almost instantaneously detecting fluid leakage from a pipeline resulting from breaks or cracks in the pipe.

During the conveyance of liquid product through a pipeline, occasionally cracks and breaks occur in the pipe, causing considerable leakage of the liquid being conveyed in the pipeline. In many instances, the liquid product being conveyed may be of a volatile or combustible nature, thereby posing the hazard of explosion or combustion of the leaked liquid. Furthermore, when such breaks occur in the vicinity of areas populated by humans or animals, or in arable regions, there is the added danger of pollution of the surrounding land and sources of potable water by the liquid. The liquids being leaked may also conceivably consist of chemicals or acids which may release toxic gases which may be harmful or destructive to life and property, thereby entailing considerable economic losses to the injured parties while concurrently subjecting users or operators of the pipeline to serious legal liabilities.

2. Description of Prior Art

In order to detect and limit the extent of liquid leakage in the event of a pipeline break, various methods and installation for detecting pipeline breaks have been developed in industry. Thus, one particular method for detecting pipeline breaks and leakage consists of measuring the quantities of liquid ($Q_A$) pumped into the pipeline, measuring the quantities of liquid ($Q_E$) emerging from the outlet of the pipeline, and intermittently comparing the measurements during the conveyance of the liquids through the pipeline. In essence, these volumetric quantity readings are primarily flow measurements in cubic meters per hour which are integrated over a specific time interval, or based on the summation of a predetermined number of compartmented measured pipeline sections. This method indicates a leak from the pipeline when there is a difference between $Q_A$ and $Q_E$, in connection with which the degree of accuracy of the measuring instruments must also be considered in order to ascertain with some degree of certainty whether there is an actual extensive leak in the pipeline. Although installations employing this type of measuring system have been and are utilized, they are subject to the disadvantages in that this particular method of leakage protection requires a considerable time lapse, in the range of from 30 to 60 minutes, for ascertaining an initial leak of the liquid resulting from pipeline breaks or cracks and to enable the taking of appropriate steps to terminate the liquid flow through the pipeline. This, of course, will result in the leakage loss of considerable quantities of potentially dangerous liquids before liquid flow through the pipeline can be terminated. Furthermore, this type of leakage detecting installation requires the use of complex measuring equipment, particularly for large diameter high-pressure pipelines, thereby rendering such installations highly uneconomical from the standpoint of these requiring extremely high initial capital investments.

SUMMARY OF THE INVENTION

The above-described leakage detecting measurement system may be replaced by a method utilizing a comparison of the measured readings proportional to the rate of fluid flow ($F_A$) at the inlet end of the pipeline, and of the rate of fluid flow ($F_E$) at the outlet end of the pipeline. The measurements obtained would then be continuously available, since the fluid flow quantity ($Q$) is equal to the integral of F with respect to time as expressed by the equation $$Q = \int F \cdot dt.$$

The measured integration time period is thus greatly reduced and evidence of pipeline leakage may be ascertained quite rapidly after its initial appearance. However, this method of leakage detection is generally subject to the disadvantage in that the errors of individual readings or measurements obtained enter into the equation, based on the summation or differences of fluid flow rate measurement which indicate an ostensible substantial fluid or liquid leakage flow from the pipeline. Consequently, determining suitable parameters or measurement boundary values actuating an alarm signifying pipeline breaking is generally not feasible, since the parameters may be prematurely exceeded through erroneous measurements due to changes in the liquid product temperature, density and viscosity. Therefore, when comparing potential leakage measurements proportional to fluid flow rate, using prior art installations, this method of leakage detection has proven to be unsuitable for practicable purposes.

A more recent method and installation for detecting liquid leakage from pipelines utilizes a comparison of the measured values of the fluid flow rates between two flow-wise points in a liquid product conveying pipeline, wherein the obtained measured values are compared, either continuously or intermittently, and if these values deviate from each other by a predetermined amount, suitable alarms indicating pipeline leakage may be actuated. Subsequently, in response to such alarm, the liquid flow through the pipeline may be terminated by means of manually operated valve or suitable mechanical or electrical shut-off devices. Although this type of pipeline fluid leakage detection method and installation functions more rapidly than other known prior art systems, it nevertheless requires the manual shutting off of the fluid flow through the leaking pipeline, coupled with a requirement for constant manual supervision of the pipeline, which will require at least a few minutes after the detection of the leakage to take steps to effectively terminate the fluid flow. In many instances, particularly where the liquids being transported are inherently volatile or combustible, or where the leaking pipeline extends through densely populated areas, this time lapse in terminating the fluid flow, based on reliance upon manual supervision and operation is sufficient to cause potentially extensive damage to life or property, or pollution of the environment in which the leakage occurs.

Accordingly, in order to substantially obviate or ameliorate the disadvantages of prior art pipeline leakage detecting systems, the present invention contemplates the use of a method and installation for the rapid or almost instantaneous detection of liquid product leakages from pipelines, adapted to prevent excessive losses of the liquids being conveyed through the pipeline, while concurrently minimizing the danger of explosion or combustion occurring due to the inherent volatile or combustible nature of the liquids, and thereby avoiding injury or damage to life, property, or pollution of arable land and potable water.

In order to effectively carry out the concepts of the present invention, the method for the rapid or instantaneous detection of pipeline leakage resulting from breaks or fractures, provides for flow-wise spaced measuring points along the pipeline, adapted to measure the rate of fluid flow passing between these measuring points, while concurrently avoiding measurement errors due to any incorrect readings of instruments. To this effect, the present method employs an automatic, continuous differentiation method over predetermined time intervals, and utilizing the differential equation (I) $d(F_A - F_E)/dt$, wherein $F_A$ is the volume or rate of fluid flow entering the pipeline, $F_E$ the volume or rate of fluid flow emerging from the pipeline, and $d/dt$ refers to the measured or elapsed interval of time. Any errors in data arising due to a gradual deviation from the actual measured values, result in measured initial values deviating from zero by an insignificant amount, when utilized in the above equation. In contrast thereto, sudden liquid leakages from pipelines resulting from breaks or fractures, instantaneously generate a large fluid leakage flow, $F_L$, which may be inserted into the equation as follows: (II) $d(F_A - _E + F_L)/dt$.

The relatively high value of $F_L$ as compared to $F_A$ and $F_E$, will provide an equation wherein the differential summation of these values when measured upon pipeline breakage, will provide considerably higher measured change of flow rate values when compared to the previous Equation I, and consequently, a previously given deviation parameter or boundary value will be exceeded. By employing suitable installations, an optical and/or acoustical alarm system may be actuated in response to the deviation from the prescribed boundaries, and furthermore, an automatic shut-off system adapted to prevent the further liquid flow through the leaking pipeline may also be provided.

A particular feature of the pipeline leakage detection method according to the present invention lies in that the pipeline utilizes fluid flow rate measuring points at the inlet end and at the outlet end of the pipeline, or at suitably spaced intermediate locations, whereby the obtained flow rate measurements at each of these measuring points are added or subtracted by a summator, and the resulting sum or difference of the calculated values is differentiated by a differentiator which converts these values, in the event these exceed predetermined parameter or boundary conditions, into electrical and/or mechanical energy in order to sound a leakage detection alarm while concurrently closing the pipeline so as to shut off the further flow of liquids.

A further feature and advantage of the present method and installation for rapidly or instantaneously detecting liquid leakages from pipelines, avoids leakage alarms and pipeline shut-downs in response to the leakage caused by tiny fissures or porosity due to gasket or pipe corrosion, and is primarily adapted to detect sudden large flow leakages resulting from fractures or breaks in the pipeline. Basically, the incompressible nature of the liquid medium being conveyed in the pipeline conveys any instantaneous change in flow as an impulse or shockwave to the measuring points, which may be remotely spaced therefrom, in a period of a fraction of or a few seconds. In this manner, without significant time lapse, which may be of the magnitude of less than 0.5 to 3.0 seconds, a definite measured signal will be produced responsive to the changes in measurement, which may be readily utilized for the automatic shutting down of the pipeline so as to prevent further liquid flow therethrough A further feature of the present invention comprises the provision of an installation for carrying out the inventive method of rapidly or instantaneously detecting pipeline leakage requiring only relatively simple mechanical and/or electrical components which are adapted to facilitate the automatic continuous or intermittent monitoring of fluid flow rate through the pipeline, and which afford the substantially instantaneous detection of major pipeline fluid leakages, in conjunction with the use of suitable alarm and pipeline shut-down devices. Furthermore, the installation is essentially automatic, requiring practically no manual observation or manipulation during normal pipeline operation and fluid flow measurement, or for the detection of major leaks in the pipeline.

Accordingly it is a primary object of the present invention to provide a method and installation for the rapid or instantaneous detection of fluid leakage from a pipeline.

Another object of the present invention is to provide a method and installation for the rapid or instantaneous detection of fluid leakage from a pipeline based on differentiated fluid flow rate values obtained by the measured summation of fluid input and output flow rates in the pipeline.

Still another object of the present invention provides for a method and installation for the rapid or instantaneous detection of fluid leakage from pipeline which contemplates the differentiation of the measured fluid flow rate input and output values signifying pipeline breakage and adapted to actuate an alarm and effect pipeline fluid flow shut-down in response thereto.

BRIEF DESCRIPTION OF THE DRAWING

In order to obtain a better understanding of the present invention, reference may now be had to the accompanying drawing wherein the single FIGURE schematically illustrates an installation for the rapid or instantaneous detection of fluid leakage from a pipeline.

DETAILED DESCRIPTION

Referring now in detail to the drawing, a pipeline 1 is adapted to receive liquid product through a pressure booster pump 2 from a source (not shown) for delivery to a storage tank 3 or the like. The pipeline 1 may be of any suitable length and diameter, as required for its particular application, thus, for example, the pipeline length may range from a few meters to hundreds of kilometers, and the pipe diameter may range in size from a few centimeters to meters.

At the inlet end of the pipeline 1 a restriction or orifice 4 provides for a predetermined fluid flow velocity or rate through the pipeline dependent upon the pressure generated by the pump 2. A similar orifice 5 is located in the pipeline 1 at its fluid outlet or exit end. Although orifices 4 and 5 are described as being at the inlet and outlet ends of the pipeline 1, it is obvious that they may be located at other suitable locations along the length of the pipeline. Since the orifices 4 and 5 are essentially identical, under ideal pipeline flow conditions, when neglecting minor fluid leakage due to corrosion porosity in the pipes or due to gasket leakage, the fluid flow velocities or rates at both of these orifices should be substantially identical.

In order to ascertain the fluid flow velocity through orifices 4 and 5, an electrical measuring instrument 6 is connected to orifice 4, while a similar electrical measuring instrument 7 is connected to orifice 5, so as to provide an indication or measurement of the fluid flow velocities or rates through respectively each of the orifices. When the fluid flow rate of the liquid product passing through orifice 4 is substantially equal to the fluid flow rate of the liquid product passing through orifice 5, the measured readings or values recorded on the electrical measuring instruments 6 and 7 will be substantially identical.

The electrical measuring instruments 6 and 7 are each suitably connected to a summation device 8 which will mathematically add or subtract any differences in the measured fluid flow rate values measured in orifices 4 and 5 by instruments 6 and 7.

The summation device 8 is connected to a differentiator 9, the latter of which differentiates the mathematical fluid flow rate values supplied thereto by the summation device 8. Fluid flow rate parameters or boundary conditions are provided in a comparator 10 which is connected to the differentiator 9. If the parameters or boundary conditions in the comparator 10 are exceeded by the values supplied thereto, the differentiator 9 is adapted to actuate an electrical relay (not shown) which by means of suitable electrical, hydraulic or mechanical connections (not shown) will correspondingly actuate one or more valves 11 positioned at predetermined spaced intervals along pipeline 1 so as to thereby effectively prevent further flow of liquid product through and from the pipeline. Concurrently, the relay will also deactivate the booster pump 2 in order to prevent the further pumping of fluids into the inlet of the pipeline 1, so as to avoid creating a pressure build-up in the pipeline.

In order to provide for the visual indication of fluid leakage from the pipeline 1, the differentiator 9 may also be connected to a suitable recording device 12, which also includes means for the written recordal of the extent of the leak in the pipeline.

Depending upon the length of the pipeline 1, one or more additional orifices similar to those shown at 4 and 5, each having measuring instruments as illustrated by 6 and 7, may be positioned at intervals ranging from 10 meters to 1,000 meters for short length of pipeline, to 1 kilometer to 100 kilometers for lengthy pipelines. Similarly a number of the pipeline shutdown valves 11 may be positioned at relatively close intervals along the pipeline 1, ranging from a few hundred meters to a few kilometers, in order to avoid leakage of excessive amounts of fluid upon fracturing or breaking of the pipeline by effectively compartmenting the latter. This, of course, is of significance when conveying potentially combustible or volatile liquids or harmful chemicals through the pipeline 1.

In applying the present invention to a typical pipeline installation, the following example may be utilized, referring to the components designated in the Figure of the drawing.

A supply of crude oil is conveyed through pipeline 1, which is approximately 55 kilometers in length and has a diameter of 400 millimeters, thereby providing for a liquid product flow rate of 700 cubic meters per hour at pipeline capacity. The crude oil is pumped into the inlet end of the pipeline 1 by the pressure booster pump 2, which obtains the crude oil from a suitable storage tank through a priming pump (not shown). They pipeline 1 includes, adjacent its inlet end, a restricted measuring orifice 4 which may be positioned downstream of a suitable scraper trap or by-pass (not shown).

A second restricted measuring orifice 5 is positioned in the pipeline 1, adjacent the outlet end thereof, upstream of the receiving tank 10, the latter of which may be a part of a refining plant or other industrial installation. The restricted measuring orifices 4 and 5 are designed so on the basis of a 100 percent capacity liquid flow rate at 700 cubic feet per hour, they generate a differential pressure head in the pipeline in the extent of 2,500 millimeters of water. The pressure differential is measured at the orifices of 4 and 5 respectively by electrical measuring transformers 6 and 7, and converted into an impressed electrical current which may range from 0 to 20 milliamperes.

The electrical current values corresponding to the fluid flow rate obtained by the electrical measuring transformers 6 and 7 are conveyed to a summator 8 wherein the measured fluid flow values measured at orifice 5 are subtracted from the fluid flow values measured at orifice 4, in effect $F_A - F_E$, these values being measured by means of a standard electrical bridge circuit. Since the orifices 4 and 5 are substantially identical, in a generally leakproof pipeline the measured electrical current values at the orifices should vary from zero milliamperes by not more than a minute or insignificant amount depending upon minor gasket or pipe corrosion fluid leakage. Thus, if a substantial liquid leak occurs due to pipeline breakage which would result in that the outlet fluid flow $F_E$ is considerably diminished, to, for example, an output flow rate of 550 cubic meters per hour, an impressed bridge circuit current of 15.7 milliamperes would be indicated as being the equivalent. Consequently, when subtracting the electrical current output obtained at orifice 4 from that at orifice 5, the equation of $F_L = F_A - F_E$ is equivalent to 20 ma − 15.7 ma = 4.3 ma. This net summated current is then relayed to a differential device 9 which is connected to the summator 8. Since apart from pipe rusting or corrosion or gasket leakage, extensive liquid leakage can only result from breaks or fractures in the piping, and since such breaks are practically instantaneously followed by sudden large leakage flows $F_L$ reaching their full values within a few seconds or fractions of a second, the resultant increase in the leakage flow emanating from such a pipeline fracture causes a corresponding increase in the electrical current measurements by the measuring transformers 6 and 7 at a rate of 1 to 2 milliamperes per second. This electrical change or increase per unit of time is transformed by the differentiator 9 into a differentiated current of 10 to 20 milliamperes which, after adjustment based on a steady leakage flow of $F_L$ again returns to zero milliamperes. This intensive variation in the differentiated electrical current is concurrently recorded on the visible recorder 12, thereby indicating to a viewer the measurement of the leak intensity and type of leak.

During this time, the generated differentiated peak current, indicating pipeline breakage or fracture, passing through the differentiator 9 is conveyed to a comparator 10 connected to the differentiator, which compares this electrical current value with boundary or parameter conditions built into the comparator. Thus, for example, if the boundary conditions signify that a differentiated current peak of 5 milliamperes or greater corresponds to the indication of a major fracture or break of the pipeline, the current being conveyed from the differentiator to the comparator will actuate a built-in electrical relay so as to release an electrical impulse. The released electrical impulse will in turn be adapted to actuate suitable signal lights and/or alarm sirens, providing visual and audio indication that there is a major break in the pipeline 1. The electrical impulse may also concurrently actuate suitable electrical remote control switching systems, (not shown) which will simultaneously and instantaneously close a plurality of shut-off valves 11 positioned at suitable intervals in pipeline 1, thereby preventing any further flow of liquid product through the pipeline.

If desired, the installation may be adapted to measure proportions of the full flow rather than full fluid flow rates. To this effect, by partly closing suitable section gates or valves, an increased pressure differential may be created upstream and downstream of the partly closed valve, which when measured will provide an approximate indication of fluid flow rate values proportional to full flow rates and thus may be employed as test values for the pipeline.

As may be readily ascertained, the present pipeline construction and leakage detector installation illustrates that the pipeline is suitable for conveying liquids having different chemical properties in successive, contiguous increments without having to shut down the pipeline system. In this connection, the leakage detector installation is also suitable for pipeline installations wherein a liquid product is introduced into the pipeline from a plurality of branches, and liquid product is removed in a similar manner at various locations along the lengths of the pipeline.

Since the pipeline leakage detection installation provides for the practically instantaneous shut-down of the pipeline upon detection of major liquid product leakage therefrom, with a minimum leakage loss of the liquid, the invention is particularly suitable for pipelines conveying in liquid form, hydrocarbons such as crude oil, fuel oil, propellants; or chemicals, particularly anhydrous or hydrated acids, or leaching liquids such as ammonia, all of which are of a relatively volatile or combustible nature. These diverse chemicals may be pumped consecutively in a contiguous manner through the pipeline.

In essence, therefore, the pipeline leakage detecting method and installation according to the present invention provide for the practically instantaneous detection of leakages caused by pipeline breakage or fracture and facilitate the automatic cessation of the liquid conveying sequence through the pipeline in order to avoid dangerous leakage of liquid product from the pipeline. Furthermore, the present invention is adapted to disregard relatively insignificant pipeline leakages due to corrosion or gasket porosity, thereby rendering the leakage detection method and installation highly reliable during operation in a pipeline system.

While there has been shown what is considered to be the preferred embodiment of the invention, it will be obvious that modifications may be made which come within the scope of the disclosure of the specification.

What is claimed is:

1. An installation for the rapid detection of fluid leakage from a length of fluid-conveying pipeline, comprising:
   a first fluid flow rate measuring means positioned in said pipeline;
   a second fluid flow rate measuring means positioned in said pipeline downstream of said first measuring means;
   summation means for adding or subtracting as required the measured fluid flow rates obtained by said first and second fluid flow rate measuring means;

differentiator means connected to said summation means, said differentiator means being adapted to differentiate the measured values calculated by said summation means and convert said values into an electrical releasing impulse; and, fluid flow shut-off means in said pipeline, said shut-off means being adapted to terminate instantaneously the flow of fluid through said pipeline in response to the generation of said electrical releasing impulse.

2. An installation as claimed in claim 1, wherein said differentiator means is adapted to generate said electrical impulse upon said differentiated measured values exceeding predetermined parameters.

3. An installation as claimed in claim 1, wherein said differentiator means generates said electrical releasing impulse for actuating said shut-off means within a time interval of about 0.5 to 3.0 seconds after detection of said fluid leakage.

4. A method for the rapid detection of fluid leakage from a length of fluid-conveying pipeline, comprising;

measuring the fluid flow rate in said pipeline at a first point;

measuring the fluid flow rate in said pipeline at a second point downstream of said first point;

summating the measured fluid flow rates obtained at said first and second points;

differentiating said summated flow rates and converting said summated flow rates into an electrical releasing impulse when said summated flow rates exceed a given parameter; and terminating fluid flow through said pipeline in response to the generating of said electrical releasing impulse.

5. A method as claimed in claim 4, wherein said electrical releasing impulse is generated within a time interval of about 0.5 to 3.0 seconds after detection of said fluid leakage.

6. A method as claimed in claim 4, wherein said fluid flow rates at said first and second points are continuously measured.

7. A method as claimed in claim 4, wherein said fluid flow rates at said first and second points are measured at time intervals of from about 1 to 60 seconds.

8. A method as claimed in claim 4, wherein said second fluid flow rate measuring point is spaced about 1 to 100 Km from said first fluid flow rate measuring point.

9. A method as claimed in claim 4, wherein said second fluid flow rate measuring point is spaced about 10 to 1,000 meters from said first fluid flow rate measuring point.

10. A method as claimed in claim 4, including determining the fluid pressure at locations upstream and downstream of pipeline constrictions adjacent said first and second measuring points, so as to obtain measurements proportional to the rate of fluid flow past said first and second points, said proportional measurements being adapted to indicate test values approximating fluid flow rates through said pipeline.

* * * * *